United States Patent [19]
Kibby

[11] Patent Number: 5,316,565
[45] Date of Patent: May 31, 1994

[54] CARBOTHERMIC REDUCTION PRODUCT GAS TREATMENT

[76] Inventor: Robert M. Kibby, P.O. Box 277, Florence, Ala. 35631

[21] Appl. No.: 52,649

[22] Filed: Apr. 26, 1993

Related U.S. Application Data

[63] Continuation-in-part of Ser. No. 809,314, Dec. 18, 1991, abandoned.

[51] Int. Cl.$^5$ .............................................. C22B 21/02
[52] U.S. Cl. .................................. 75/10.27; 75/10.36; 75/10.38; 75/500; 75/674; 75/707
[58] Field of Search ................ 75/10.27, 10.38, 10.36, 75/674, 500, 707, 414

[56] References Cited

U.S. PATENT DOCUMENTS
Re. 32,247  9/1986  Stephens, Jr. ......................... 75/446

FOREIGN PATENT DOCUMENTS
126730  7/1984  Japan ..................................... 75/674

Primary Examiner—Melvyn J. Andrews

[57] ABSTRACT

Method and apparatus for reducing the quantity of carbon dioxide emitted to the atmosphere from carbothermic processes producing metals are described. The method involves rejecting carbon from the process system or using carbon as a reagent to be recycled within the boundaries of the process system as a result of reactions of hydrogen with the carbon monoxide produced by the carbothermic process. Examples of the application of the method are given for the production of aluminum and for the production of a portion of the iron content of steel.

20 Claims, 1 Drawing Sheet

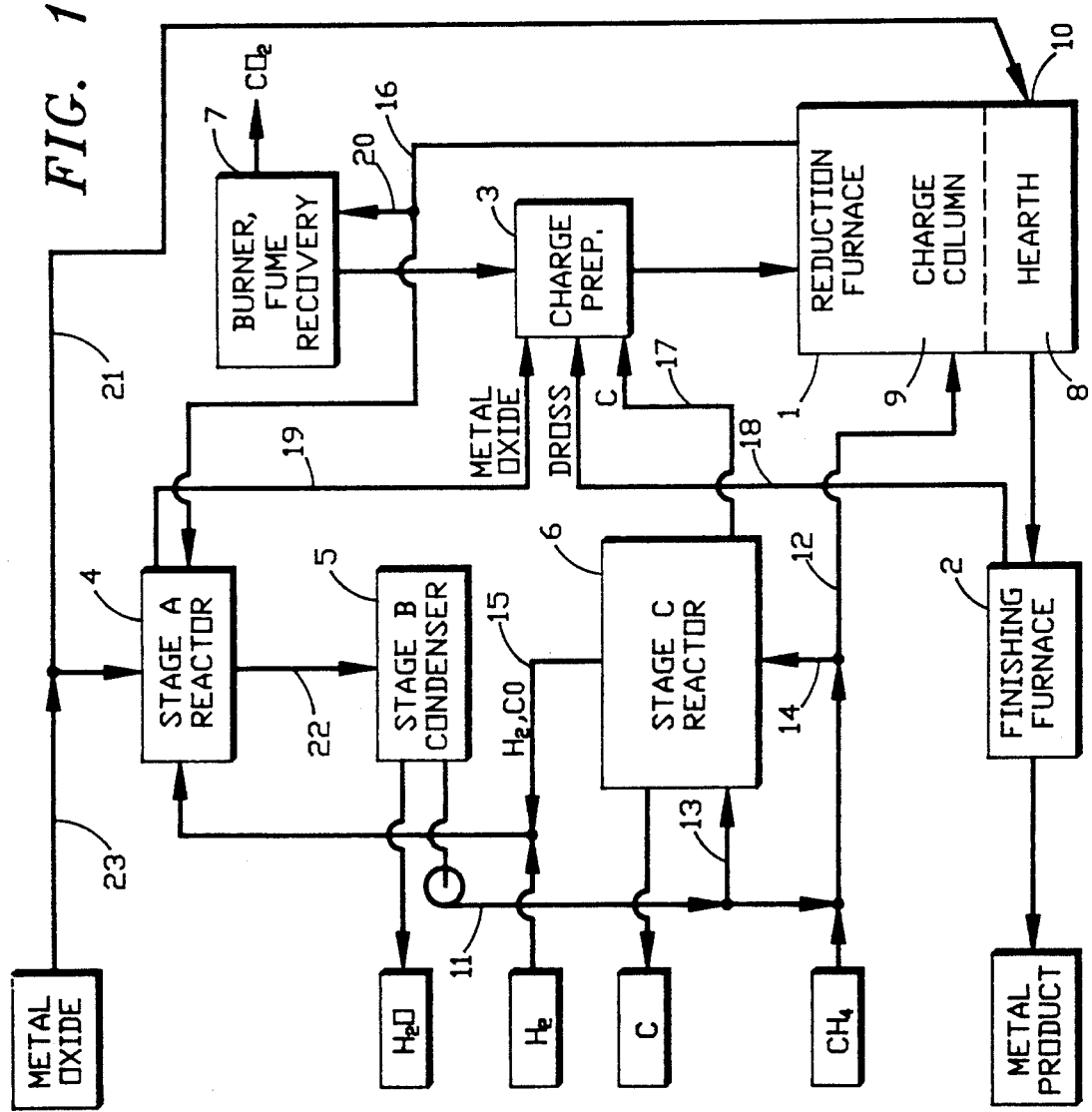

CARBOTHERMIC REDUCTION PRODUCT GAS TREATMENT

CROSS REFERENCES TO RELATED APPLICATIONS

This application is a continuation-in-part of U.S. patent application Ser. No. 07/809,314, Dec. 18, 1991 now abandoned.

BACKGROUND OF THE INVENTION

1. Field of the Invention

This invention relates to the carbothermic production of metals, such as aluminum and silicon, which employ carbonaceous reducing agents under thermal reduction conditions.

2. Description of Prior Art

Silicon metal has been produced commercially for many years by the thermal reaction of carbon with oxides of silicon to produce silicon metal and carbon monoxide. The carbon monoxide, is then further oxidized by contact with air and emitted to the atmosphere as carbon dioxide.

Ferroalloys, iron and steel are also produced by the thermal reaction of carbonaceous reductants with oxides of the metals to be produced, emitting carbon oxide gases to the atmosphere.

Aluminum metal has been and is presently being produced commercially by the electrolysis of a fluoride bearing molten salt. This process also emits carbon dioxide to the atmosphere.

Public concern is increasing over the environmental effects of carbon dioxide emissions to the atmosphere, and especially over the emissions of fluorocarbon gases. It is therefore understandable that interest is increasing in finding processes for producing metals which do not emit carbon oxide gases to the atmosphere, and especially for finding a process for producing aluminum which does not emit carbon dioxide, and one which does not use fluoride bearing materials.

Electrolysis processes for the production of aluminum are being investigated in a cooperative effort of industry and the U.S. Department of Energy. These processes employ inert anodes and, in principle, could emit oxygen instead of carbon dioxide. However the processes presently being studied still employ fluoride bearing electrolytes.

An electrolysis process for producing aluminum employing a chloride electrolyte has been proposed. However this process would emit carbon dioxide, and, because of reported problems with various chlorine based compounds as by-products, the work on this process has not resulted in significant production of aluminum.

Production of aluminum by carbothermic reduction can be performed without the involvement of fluorine or chlorine based compounds, except for the use of chlorine based gases as are currently used in remelting aluminum and preparing it for commercial use. Carbothermic production of aluminum therefore offers an important relief from the problem of fluorocarbon gas emissions from aluminum production facilities. However, carbothermic production of aluminum produces approximately twice the carbon dioxide per pound of aluminum produced as the currently used electrolytic process produces. Consideration of this fact has had the effect of retarding progress toward the proof of a commercial process which would eliminate the fluorocarbon emission problem in the production of aluminum.

SUMMARY OF THE INVENTION

It is accordingly an object of this invention to provide a process to treat gases produced by the essential use of a carbonaceous reducing agent in the production of a metal from a metal oxide to recover a selected portion of the carbon content of said gases and to recycle said recovered carbon to the metal production process.

It is a particular object of this invention to provide a process having the capability of recovering a selected part, including the entire amount, of the carbon content of the gases produced by the carbothermic reduction of aluminum oxides and/or silicon oxides and to recycle said recovered carbon to the carbothermic reduction process, thereby reducing the emission of carbon oxide gases to the environment.

Processes to produce metal which require carbonaceous reducing agents (such as processes to produce ferroalloys, iron, steel, aluminum or silicon) may be practiced without emitting carbon monoxide or carbon dioxide to the environment by using carbon as a reagent to be recycled within the boundaries of the processes.

The method of this invention which recovers carbon from the gases produced by carbothermic reduction of metal oxides comprises the following steps:

A. Reacting said gases with hydrogen to produce carbon, hydrocarbon gases, and water;

B. Condensing the water and separating it from the hydrocarbon gases produced in step A;

C. Cracking the hydrocarbon gases from step B to produce hydrogen and carbon for re-use in the process; and D. Introducing additional hydrogen from outside sources to make up the hydrogen requirement of step A.

The hydrogen resulting from cracking the hydrocarbon gases produced in step A is insufficient to convert all of the carbon monoxide in step A, and must be supplemented by process input hydrogen, which can be in the form of elemental hydrogen or a hydrocarbon gas. If a hydrocarbon gas is used as the source of hydrogen makeup, then surplus carbon will be produced when there is no carbon monoxide or carbon dioxide discharged from the carbothermic reduction system, the amount of surplus carbon depending on the carbon/hydrogen ratio of the makeup gas for step D. If no surplus carbon is to be produced, then the amount of carbon monoxide and/or carbon dioxide gas discharged from the carbothermic reduction system will depend on the carbon/hydrogen ratio of the makeup gas for step D.

Minor amounts of gases with carbon/hydrogen ratios greater than for methane might be produced in step A and, for minimum impact on the environment, they must be cracked to produce carbon and hydrogen in step C.

Methods have been disclosed in U.S. Pat. No. 4,533,386 to produce aluminum carbothermically from aluminum-containing ores such as laterite. These processes can also be adapted to produce aluminum without emitting carbon oxide gases to the atmosphere.

BRIEF DESCRIPTION OF DRAWINGS

FIG. 1 is a schematically illustrated closed recycling system which includes a reduction furnace 1, a final finishing furnace 2, charge preparation facilities 3, reactors 4 and 6, condenser 5, and burner-fume collection system 7. Reduction furnace 1 further comprises a hearth 8, charge column 9, and port 10 for addition of materials directly to the hearth. Furnace 1 as hereinabove described corresponds to furnace 130 of FIG. 5 of U.S. Pat. No. 4,388,107.

DESCRIPTION OF PREFERRED EMBODIMENTS

In the first preferred embodiment described hereinafter, three stages are added to the method and apparatus of example 5 of the specification of U.S. Pat. No. 4,388,107, the entire disclosure of which patent is incorporated herein by reference.

The apparatus described for example 5 of U.S. Pat. No. 4,388,107 comprises a reduction furnace with a hearth over which is situated a charge column with means for controlled transfer of materials from the charge column to the hearth and means to admit alumina directly to the hearth. In the preferred embodiments described herein for the production of aluminum the above described furnace is modified to provide open arcs between electrodes as shown in FIGS. 1 and 2 of U.S. Pat. No. 4,334,917 rather than open arcs between electrodes and the liquids resting on the surface hearth. The apparatus for example 5 of U.S. Pat. No. 4,388,107 further comprises gas fluxing, charge preparation, and fume recovery means.

The method of U.S. Pat. No. 4,388,107 is characterized in terms of eight stages, which are described in the '107 patent beginning on line 1 of column 10 and ending on line 58 of column 10 thereof. The first three stages occur in the charge column of the reduction furnace. Stages four (IV) through seven (VII) occur on the hearth of the furnace. Stage eight (VIII) occurs in a conventional holding furnace operation by simple separation of the molten product of previous stages into two fractions, product metal and a dross containing some aluminum, some aluminum carbide, and some slag components. Conventionally used fluxing gas aids the separation into molten aluminum and a dross fraction.

In a furnace charge preparation facility, the dross from Stage VIII and recovered furnace fume are combined with the carbon for reduction and that portion of the alumina for reduction that is not admitted directly to the hearth in Stage VI.

The first preferred embodiment of the instant invention adopts the above described stages of operation and adds three stages A, B, and C having the function of treating the carbon monoxide leaving Stage I to recover carbon therefrom and returning said carbon to the charge preparation facility for use in stage I as follows:

Stage A—Carbon monoxide, undiluted and unreacted with air, leaves the Stage I zone of the reduction furnace charge column and is reacted with hydrogen below 560 deg. C. to produce methane, carbon dioxide and water vapor. The reaction occurs in the presence of a nickel catalyst in a fluidized bed of the alumina for the process which is separated from the catalyst and then is sent to the charge preparation facility. Some of the carbon for reduction may also be formed in Stage A. It is also separated from the catalyst and sent to the charge preparation facility.

Stage B—Water is condensed and separated from the methane and carbon oxide gases discharged from Stage A.

Stage C—A portion of the dry gas leaving Stage B may be admitted to the charge column of the reduction furnace to proceed upwardly through the charge column where it decomposes and provides carbon for vapor back reactions. Any hydrogen produced from methane in the reduction furnace stages II and III reports to Stage A mixed with the carbon monoxide and aluminum monoxide departing Stage I. The portion of the methane-carbon oxide gas leaving Stage B which is not admitted to the furnace charge column is sent to Stage C where it is decomposed in an electrically heated fluidized bed of carbon. Most of the carbon required for reduction is produced in stage C and sent to the furnace charge preparation facility. Supplemental hydrogen is introduced in Stage A which, in combination with the hydrogen produced in Stage C from methane produced in Stage A, provides the total hydrogen required for Stage A.

If it is desired to produce the supplemental hydrogen required for Stage A from a hydrocarbon gas, this gas is introduced in Stage C. The relationship of the carbon/hydrogen ratio of the input hydrocarbon gas to the surplus carbon produced and the net carbon dioxide emitted from the process is shown in Tables I, II and III.

The process does not require that any hydrocarbon gas be admitted to the furnace hearth to be carried upward through the charge column. The advantage of doing so is that heat is absorbed in cracking the hydrocarbon gas to provide carbon to react with aluminum monoxide and aluminum vapor entering the charge column. This has the effect of permitting greater vaporization in the hearth reactions without exceeding the capacity of the charge column to usefully absorb the heat of vapor back reactions.

TABLE I

| Process Input Gas: Hydrogen. C/H weight ratio: 0/1 | |
|---|---|
| Per 100 lbs. Al produced: | |
| Lbs. carbon dioxide emitted: | 0 |
| Lbs. surplus carbon produced: | 0 |
| Lbs. process gas input: | 12 |

TABLE II

| Process Input Gas: Methane. C/H weight ratio: 3/1 | | | |
|---|---|---|---|
| Per 100 lbs. Al produced: | | | |
| Lbs. carbon dioxide emitted: | 0 | 44 | 88* |
| Lbs. surplus carbon produced: | 36 | 18 | 0 |
| Lbs. process gas input: | 48 | 40 | 32 |

TABLE III

| Process Input Gas: Ethane, C/H weight ratio: 4/1 | | | |
|---|---|---|---|
| Per 100 lbs. Al produced: | | | |
| Lbs. carbon dioxide emitted: | 0 | 66 | 104* |
| Lbs. surplus carbon produced: | 48 | 18 | 0 |
| Lbs. process gas input: | 60 | 45 | 36 |

The preferred mode of controlling the flow of gases to, from, and between the reduction furnace and stages A and C is to establish a constant composition of input gas, then to set the controls for a desired proportion of carbon monoxide from the furnace that bypasses Stage A and goes directly to a burner and fume scrubber, and then to control the rate of input gas as a percentage of total furnace carbon monoxide discharge to achieve the surplus carbon generation desired, according to the characteristics shown as examples in tables I, II, and III above.

The second preferred embodiment of the instant invention omits Stage C of the first preferred embodiment. Stage A is conducted in a fluidized bed of alumina and carbon operated in the temperature range 400 deg. to 500 deg. C. The input gas to the process is hydrogen. Product gas from Stage A is a mixture of carbon dioxide, carbon monoxide, methane, hydrogen, and water vapor. The water vapor is condensed in Stage B and the gaseous product of Stage B is admitted directly to the charge column of the reduction furnace. The advantage of the second preferred embodiment over the first is that only one fluidized bed reactor is needed and it does not have to have as much heat input as the two-stage reactor system of the first embodiment. The disadvantages are that process gas inputs of hydrocarbons are not as readily processed and there is a much higher loading of recycled carbon-oxygen gases through the furnace charge column.

Vapor generation in the reduction furnace hearth reactions is minimized when the rate of heat delivery to the surface of the hearth melt is only great enough to overcome furnace heat losses and transfer heat to the melt at a rate to match the reaction rates of the desired reactions. Open arcs directly striking the melt exceed this rate at times and cause excessive vaporization. For this reason the preferred mode of heat delivery is from open arcs between electrodes, rather than from electrodes to the melt.

In examples 1–4 to follow, the facilities are as described above and shown schematically in FIG. 1, comprising the reduction furnace of example 5 of U.S. Pat. No. 4,388,107, modified to provide for open arcs between electrodes, and further comprising gas fluxing, charge preparation, and fume recovery facilities, fluidized bed reactors as described above, and the necessary conduits, pumps and control systems to control the flow among the units.

The material and energy balance of Table IV of U.S. Pat. No. 4,388,107 applies to example 5 of that disclosure and is employed herein as the basis for calculating the flow rates in examples 1–4 to follow. The material balance of Table IV shows the amount of aluminum monoxide and aluminum vapors that react with carbon in the charge column (stages 2 and 3). The amount of methane that can be admitted to the reduction furnace to provide this carbon is calculated to be 19.2 lbs. per 100 lbs. of aluminum produced.

EXAMPLE 1

Furnace charge is prepared and the reduction furnace 1 is started up and operated as described in example 5 of U.S. Pat. No. 4,388,107. During the startup period, all the gas, including carbon monoxide, produced and discharged from the reduction furnace is routed to a burner and dust collection system 7 and the oxidized gases are discharged to the atmosphere.

Alumina in powder form is charged to and fluidized in reactor 4 for Stage A. Calcined petroleum coke powder is charged to and fluidized in reactor 6 for Stage C and is heated to a temperature above 560 deg. C., preferably 800 deg. C., by passage of electric current between electrodes in contact with the fluidized bed of carbon. The initial fluidizing gas is methane, which is circulated by a pump in the discharge line of the condenser of Stage B and the input line 13 of the reactor of Stage C.

Input gas for this example is methane. For each 100 lbs. of aluminum produced, 48 lbs. of methane is admitted to the reactor of Stage C through line 14. Mixtures of hydrogen and carbon monoxide leave Stage C through line 15 and the reduction furnace through line 16 to enter Stage A reactor, where a gas mixture rich in methane is produced. In [s]Stage B, water is condensed from the product of Stage A and discharged from the system. A portion of [s]Stage B product containing 19.2 lbs of methane goes to the furnace charge column through line 12 and passes upwardly through the charge column 9, where it cracks to produce 14.4 lbs. of carbon for reaction with aluminum monoxide and aluminum vapor, and produces 4.8 lbs. of hydrogen. The remaining methane leaving Stage B goes to the reactor 4 of Stage C where, in combination with the input gas, it produces 57.5 lbs. of carbon for reduction charge formulation and 36 lbs. of surplus carbon. Of the 189.1 lbs. of alumina entering the system through line 23, 47.3 lbs. goes to furnace charge preparation through Stage A reactor and 141.8 lbs goes to the furnace hearth through line 21, according to the mass balance of U.S. Pat. No. 4,388,107, Table IV. In summary, for this example, for each 100 lbs. aluminum produced, the process input gas is 48 lbs. of methane, no carbon oxide gases are emitted to the atmosphere, and 36 lbs. of pure carbon is produced in excess of the process requirements.

EXAMPLE 2

The apparatus system, startup, and operating procedure are as in example 1, except that no gas is admitted to the charge column of the reduction furnace through line 12. For each 100 lbs. of aluminum produced, 32 lbs. of methane from outside sources is admitted to the reactor 6 of Stage C. Hydrogen mixed with carbon monoxide leaves Stage C and enters Stage A reactor 4. 56 lbs. of the carbon monoxide leaving the reduction furnace 1 goes to a burner and dust collector 7 and leaves the system as 88 lbs. of carbon dioxide. In summary, for this example, the process input gas is 32 lbs. of methane, 88 lbs. of carbon dioxide is emitted to the atmosphere, and there is no surplus carbon made.

EXAMPLE 3

The apparatus system, startup, and operating procedure are as in example 1, except that no gas is admitted to the charge column of the furnace through line 12. The input gas is hydrogen. For each 100 lbs. of aluminum made, 12 lbs. of hydrogen from outside sources is combined with 24 lbs. of hydrogen made in reactor 6 of Stage C and is fed to reactor 4 of Stage A. This combined stream provides the amount required to convert all the carbon monoxide from the reduction reaction to an equilibrium mixture of carbon monoxide, carbon dioxide and methane. 72 lbs. of the coke generated in Stage A and from the decomposition of methane in Stage C is sent to the furnace charge preparation facility 3. In summary, for 100 lbs. of aluminum product, the process input gas is 12 lbs. of hydrogen and there is no surplus carbon generated and no carbon dioxide emitted to the atmosphere.

EXAMPLE 4

The apparatus system is the same as in example 1, except that fluidized bed reactor 6 is omitted and the output from Stage B condenser is pumped through line 12 directly to the charge column of furnace 1. Startup and operating procedures are as in example 1. The startup bed in reactor 4 for Stage A is alumina. The initial circulating gas for maintaining a fluidized bed in reactor 4 is methane. The input gas is hydrogen. For each 100 lbs. of aluminum produced, 12 lbs. of process input hydrogen is admitted to the reactor of Stage A. Gas leaving Stage A reactor 4 has, typically, a molar composition[:] of 44% water, 13% carbon dioxide, 1% carbon monoxide, 25% methane, and 17% hydrogen. After losing 108 lbs. of water in the condenser, the gas stream having a molar composition of 18% water, 19% carbon dioxide, 1% carbon monoxide, 37% methane and 25% hydrogen[.], [After losing 108 lbs. of water in the condenser, this gas stream] is pumped through line 12 to enter the charge column 9, where it is heated to convert the carbon dioxide to carbon monoxide and crack the methane content to provide, in combination with carbon produced in Stage A, the 72 lbs. of carbon required to produce the 100 lbs. of aluminum of this example. In summary, for 100 lbs. of aluminum product, the input gas is 12 lbs. of hydrogen, there is no surplus carbon generated and no carbon dioxide emitted to the atmosphere. With hydrogen as the process input gas, the burner-fume collector 7 is only used when venting to adjust the system pressure.

Applications of the principles of this invention in processes to produce ferroalloys and silicon will be apparent to those skilled in the art. A particularly useful application is in the production of a portion of the iron content of steel by the reaction of iron carbide with iron oxide in electricly heated furnaces, where the iron carbide is produced by reacting iron oxide with natural gas, the principal constituent of which is methane. In such an application, without rejecting carbon from the process system, the amount of carbon oxide gases emitted to the atmosphere can be reduced to one third the amount that would be emitted by using carbon as the entire supply of reductant and not treating the reduction furnace gases to decrease the carbon oxide content thereof. This application for producing at least a portion of the iron content of steel is described in example 5.

EXAMPLE 5

The apparatus system is as shown in FIG. 1. In this application, iron oxide is introduced to a downwardly moving bed which is maintained at a temperature in the range 450 deg. to 650 deg. C. in reactor 4. Reactor 6 contains an electrically heated fluidized bed of carbon, maintained at a temperature above 560 Deg. C., preferably at 800 deg. C. Input gas is natural gas, principally methane. For each 100 lbs. of iron produced (mixed with steel scrap in the hearth 8 of furnace 1) 31 lbs. of methane is admitted to reactor 6 through line 14, of which 14 lbs. is methane from process input gas and the remainder is from reactor 4. The methane decomposes in reactor 6 to produce hydrogen, which reports to reactor 4 where it reduces iron ore to FeO and reacts with carbon monoxide to produce methane and water vapor. Methane decomposition in reactor 6 produces carbon which reacts in the charge column 9 of furnace 1 with iron oxides to produce iron carbide and carbon monoxide. On the furnace hearth 8 of furnace 1, iron carbide reacts with iron ore to produce iron and more carbon monoxide. Of the 55 lbs. of carbon monoxide produced in furnace 1, 30 lbs. is converted to methane, carbon dioxide and carbon in reactor 4 and 25 lbs. is discharged through line 20. In summary for this example, for each 100 lbs. of iron produced, 14 lbs. of methane is consumed and 25 lbs. of carbon monoxide is discharged from the process system through line 20.

The amount of carbon monoxide released from the process system through line 20 can be further decreased by introducing more methane from outside the system, but this increased use of methane will be accompanied by the production of surplus carbon.

Release of carbon and carbon oxide gases from the process system can be minimized by using hydrogen instead of methane as input gas.

The term "carbon oxide gases" as used herein means the carbon monoxide produced by reaction of a carbonaceous reductant with metal oxide and the carbon dioxide resulting from further oxidation of carbon monoxide produced by the said reaction of a carbonaceous reductant with metal oxide.

It should be understood that the invention is not to be limited by the foregoing embodiments but includes all variations that would occur to one skilled in the art as defined by the appended claims.

What is claimed is:

1. A process for producing metal comprising the steps:
   A. reacting a carbonaceous reductant with an oxide of a metal while providing heat input sufficiently high to produce said metal and a gas containing carbon monoxide;
   B. separating said gas produced in step A from said metal;
   C. recovering said metal from Step B;
   D. reacting the carbon monoxide in said gas separated from the said metal with hydrogen at a temperature below 560 deg. C. to produce carbon and water;
   E. separating said carbon from said water produced in step D;
   F. discharging said water separated in step E from the production system employing the method comprising steps A through E, whereby the amount of carbon oxide gases emitted to the atmosphere is less than would be emitted without employing steps D, E and F.

2. The process of claim 1, wherein a selected portion of the said carbon separated from water in step E is used to form at least a portion of the carbonaceous reductant reacted in step A.

3. The process of claim 1, wherein step D further comprises the steps:
   G. reacting carbon monoxide leaving step B with hydrogen to produce a hydrocarbon gas and water;
   H. decomposing said hydrocarbon gas produced in step G into carbon and hydrogen; and
   I. returning said hydrogen to step D for reaction with carbon monoxide introduced to step D.

4. The process of claim 3, wherein said hydrocarbon gas is principally methane.

5. The process of claim 3, wherein the reaction of said step H occurs in a fluidized bed of carbon.

6. The process of claim 5, wherein said fluidized bed of carbon is heated by passage of electric current between electrodes submerged in said fluidized bed.

7. The process of claim 3, wherein the source of hydrogen for step G is the combination of the product of decomposing said hydrocarbon gas in step H with the product of the decomposition of a hydrocarbon gas introduced to the process from sources outside the process.

8. The process of claim 7, wherein the flow rate of the hydrocarbon gas from said external source is selectively controlled, in combination with the flow rate of carbon dioxide emitted from the process, to yield the desired rate of producing carbon in excess of the requirements of the carbothermic reduction process of claim 7.

9. The process of claim 1, wherein all reactions for step D occur in a fluidized bed containing a mixture of carbon and the metal oxide to be used as feed for the said carbothermic metal producing process.

10. A carbothermic process for producing aluminum containing aluminum carbide, comprising the following steps:
   A. on a furnace hearth, reacting a mixture comprising solid aluminum carbide and carbon with a liquid slag comprising alumina and aluminum carbide, while providing heat input sufficiently high to produce vapors comprising aluminum metal, aluminum monoxide and carbon monoxide, and liquid aluminum containing aluminum carbide;
   B. decomposing said slag in the absence of reactive carbon or solid aluminum carbide to produce additional aluminum and vapors comprising aluminum metal, aluminum monoxide, and carbon monoxide;
   C. passing said vapors produced in steps A and B through at least one zone where said vapors react to produce alumina, aluminum tetraoxycarbide and aluminum carbide;
   D. employing the product of step C as a part of said mixture in step A which reacts with said liquid slag on said furnace hearth; and
   E. recovering product aluminum containing aluminum carbide from step B;
   F. Reacting carbon monoxide leaving step C with hydrogen to produce carbon and water;
   G. separating said carbon from said water produced in step F; and
   H. discharging said water separated in step G from the production system employing the method of steps A through G,
whereby the amount of carbon oxide gases emitted to the atmosphere is less than would be emitted without employing steps F, G and H.

11. The process of claim 10, wherein a selected portion of the said carbon separated from water in step G is used to form at least a portion of the said mixture of solid aluminum carbide and carbon reacted in step A.

12. The process of claim 10, wherein step F further comprises the steps:
   I. reacting carbon monoxide leaving step C with hydrogen to produce a hydrocarbon gas and water;
   J. decomposing said hydrocarbon gas into carbon and hydrogen; and
   K. returning said hydrogen to step F for reaction with carbon monoxide introduced to step F.

13. The process of claim 12, wherein the reaction of said step I occurs in a fluidized bed of the carbon to be used as a reducing agent in the process of claim 12.

14. The process of claim 13, wherein said fluidized bed of carbon is heated by passage of electric current between electrodes submerged in said fluidized bed.

15. A process for producing metal comprising the steps:
   A. in a first reaction zone, reacting a carbonaceous reductant with an oxide of a metal while providing heat input sufficiently high to produce said metal and a gas containing carbon monoxide;
   B. separating said gas produced in step A from said metal;
   C. recovering said metal from step B;
   D. in a second reaction zone, reacting the carbon monoxide in said gas separated from the said metal in step B with hydrogen at a temperature below 560 deg. C. to produce carbon and a gas mixture comprising methane and water;
   E. separating and discharging water from the said carbon and gas mixture produced in step D; and
   F. in a third reaction zone maintained at a temperature above 560 deg. C, reacting said gas mixture produced in step D, after said gas mixture is separated from water in step E, to produce carbon and hydrogen.

16. The process of claim 15, wherein the reaction of step F occurs in a fluidized bed containing carbon.

17. The process of claim 16, wherein said fluidized bed is heated by passage of electric current between electrodes submerged in said fluidized bed.

18. The process of claim 15, wherein the source of hydrogen for step D is the combination of the product of decomposing methane produced in step D with the product of decomposing a hydrocarbon gas introduced to the process from sources outside the process.

19. The process of claim 15, wherein the reaction of step F occurs in a zone where reactants for step A, comprising said carbonaceous reductant and said metal oxide, are heated with carbon monoxide produced in step A.

20. The process of claim 15, wherein selected portions of the carbon produced in steps D and F are used to form at least a portion of the carbonaceous reductant reacted in step A.

* * * * *